United States Patent Office 3,475,536
Patented Oct. 28, 1969

3,475,536
METHOD FOR THE SYSTEMIC CONTROL OF ECTOPARASITES WITH PHOSPHORODIAMIDATES
Lisby L. Wade, Lake Jackson, and James F. Landram, Angleton, Tex., assignors to The Dow Chemical Company, Midland, Mich., a corporation of Delaware
No Drawing. Filed June 1, 1967, Ser. No. 642,700
Int. Cl. A61k 27/00
U.S. Cl. 424—220    7 Claims

ABSTRACT OF THE DISCLOSURE

The present invention is directed to methods employing, and compositions comprising, a phenyl phosphate, as hereinafter defined; these methods and compositions are useful in animal husbandry for improving the health of warm blooded animals and especially for controlling ectoparasites attacking such animals. The phenyl phosphate to be employed in accordance with the present invention is a compound of the following formula:

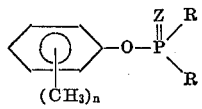

wherein Z represents oxygen or sulfur; each R independently represents methylamino (—NHCH$_3$) or dimethylamino (—N(CH$_3$)$_2$); and $n$ represents an integer of from 0 to 1, both inclusive.

BACKGROUND OF THE INVENTION

Field of the invention

Warm blooded animals are subject to attack by a great number of different parasites. Such parasites include those generally spoken of as "internal parasites"—parasitic organisms which are ingested into the animal body, or otherwise gain entry into the interior, typically into the digestive tract, of the animal body. The most common of such parastic organisms are the helminths, such as for example, Haemonchus, Trichuris, Trichostrongylus, Cooperia, Bunostomum, Oesophagostomum, Ostertagia, Hymenolepis, Ascaris, and Ancylostoma. Another major category of parasites attacking warm blooded animals is a category generally described as "ectoparasites"—parasitic organisms which attack the animal body at least initially, but generally only, on its exterior surfaces. Representative ectoparasites include ticks, fleas, lice, chiggers, and flies such as the stablefly and the screw-worm fly.

All parasites attacking warm blooded animals cause detriment to the animals. In the instance of the helminths, there is generally internal hemmorrhage, and as a consequence, anemia, weakness and tissue necrosis. Most of the ectoparasites live on fluids taken from the warm blooded host animal—typically, the fluid is the blood of the host animal, but sometimes it is the lymph or fatty deposits. The loss of this fluid similarly causes anemia, weakness, sluggishness, and the like. All of these attacks by parasites have the effect of diminishing the growth of the animals concerned. In addition, the attacks of the parasites, particularly the ectoparasites, cause severe physical discomfort to the host animals; and the ectoparasites, because of their movement to and from various host animals in the course of their life history, frequently transmit yet other diseases to the host animals.

Description of the prior art

The control of these parasites has long been a subject of interest, and, methods have been discovered which offer a means of control, though not always completely satisfactory, of the internal parasites. However, those parasites which are ectoparasites have presented a particularly severe control problem. A modest degree of control has sometimes been achieved by rotation of pastures upon which the animals are being raised, or, in the instance of animals being raised indoors, by scrupulous cleanliness. The only method of direct treatment of host animals which has been of sufficient value to warrant the required expenditure of time has been an external application of a substance, typically a crude petroleum mixture, toxic to the ectoparasite on contact with the organism. This means of control, though, is of limited value because it necessitates a separate treatment that must be administered individually and repeated regularly to obtain any benefit.

A long held goal has been the discovery of a substance or substances which would control the ectoparasites when fed to susceptible host animals. This approach to ectoparasite control is spoken of as a systemic control, however, the goal has hitherto not been met: generally, the substances proposed for this type of treatment do not have sufficient toxicity to the ectoparasites at rates at which they are tolerable, with a satisfactory safety margin, to the host animals. Certain substances have been found which are effective against one or a few specific ectoparasites, but in view of the circumstances under which many domestic animals are raised, under which circumstances they are subject to attack by parasites of a very great variety, such substances have only marginal utility. Therefore, to the present time, there is no substance which will provide adequate systemic control of a variety of ectoparasites at rates that are of sufficiently low toxicity to the host animals.

SUMMARY AND BRIEF DESCRIPTION OF THE PRESENT INVENTION

The present invention is directed to methods employing and compositions comprising certain phenyl phosphate compounds which have been found to be useful for the control of parasite organisms attacking warm blooded animals. In particular, these compounds have been found to be useful for the control of a wide variety of ectoparasites when fed to the host animals subject to attack by such ectoparasites. Thus, the present invention meets the long sought objective of systemic ectoparasite control. These phenyl phosphate compounds are of the following formula:

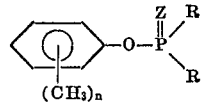

In the above and succeeding formulae in the present specification and claims, Z represents oxygen or sulfur; each R independently represents methylamino (—NHCH$_3$) or dimethylamino (—N(CH$_3$)$_2$); and $n$ represents an integer of from 0 to 1, both inclusive. The compounds are viscous liquids or crystalline solid materials. They are not repellent to animals at rates at which they are effective for the control of ectoparasites; hence, they can be employed in admixture with grain rations or animal feeds. They can be administered continuously or intermittently in dosages sufficient to improve growth, to improve the feed efficiency, to improve the nutritive value and utilization of feed or to protect the animal from the attack of ectoparasites, without in any way causing detriment to the animal and without imparting any unpalatable characteristic to animal flesh. Furthermore, in combination with an anticoagulant substance, such as 3-(α-acetonylbenzyl)-4-hydroxy coumarin, the phenyl phosphate compounds can be employed in the management of typhus disease carried by the oriental rat flea, an ectoparasite on rats, as well as other diseases carried by ectoparasites on rats and the like. Here, in the instance of typhus, for example, it is desired to first eradicate the fleas parastic on the rats, to remove such fleas as a carrier of the disease, and to thereafter kill the rats, themselves, to remove them as a possible host for any future flea infestation—as well as to generally improve sanitation.

Excellent systemic control of ticks can be achieved by the practices of the present invention, whereas hitherto there has been no means of achieving systemic control of ticks.

DETAILED DESCRIPTION OF THE INVENTION

The administration or feeding of an effective dosage of at least one of the phenyl phosphate compounds to be employed according to the present invention is essential and critical to the practice of the present invention. The amount of one or more of the compounds which will constitute an effective dosage varies considerably and is dependent upon such factors as the animal concerned, the age and size of the animal, the parasitic organism against which protection is sought, the life stage of such organism against which protection is sought, the particular compound employed, whether or not toxicity to the host animal can be accommodated, and the like. In general, good results are obtained when there is administered to an animal a dosage of from 1.0 to 1,000 milligrams of one of the compounds per kilogram of body weight and preferably from 1.0 to 500 milligrams per kilogram of body weight. Where the compound is administered on a daily schedule, good results are obtained when employing daily dosages of from 1.0 to 150 milligrams or more of one of the compounds per kilogram of animal body weight. Where the danger of reexposure to the attack of parasites is low, good results are obtained when there is administered to an animal a daily dosage of from 1.0 to 50 milligrams or more per kilogram of body weight.

The method of the present invention can be carried out by administration or feeding of the unmodified compounds. However, the present invention embraces the employment of any liquid, powder, mash, drench, bolus, pellet, capsule or other composition containing one or more of the active compounds. Most typically, the compounds are modified with one or more of a plurality of additaments or innocuous ingestible adjuvants including water, ethanol, skim milk, edible oils, propylene glycol, syrups, grain rations, surface active dispersing agents such as the liquid and solid emulsifying agents, and edible solid carriers such as edible powders and commercial animal feeds, concentrates or supplements. By "commercial animal feeds, concentrates or supplements" are meant the partial and complete animal feeds containing desirable amounts of minerals, vitamins, antioxidants, antibiotics and growth stimulants. Where the adjuvant is an edible finely divided solid carrier, or especially where the adjuvant is the combination of an edible solid carrier with a surface active dispersing agent, such adjuvant cooperates with the active agent so as to facilitate the invention and obtain an improved result. Further, the compositions are adapted to be fed to animals to supply the desired dosage of active agents, or to be employed as concentrates and subsequently diluted with additional carrier or adjuvant to produce the ultimate compositions.

The exact concentration of the compounds to be employed in the compositions can vary provided that enough of the composition is ingested by the animal so as to provide the required internal amount of active ingredient as discussed hereinabove. Liquid or solid compositions containing from 0.5 to 98 percent by weight of one or more of the agents are conveniently employed to supply the desired dosage. Thus, compositions to be employed in the implementation of the present invention can vary in concentration from relatively dilute to relatively concentrated. A representative relatively concentrated composition is an animal feed supplement containing one or more of the active agents and nutritive supplementary materials, offered to animals as a supplement to regular feed. Such a composition, for example, can be in the form of a saltblock containing a portion of sodium chloride and, optionally, other substances. Where such a salt block is provided as a supplementary food for cattle feeding on range, good results are obtained with compositions containing from 5 to 25 percent by weight of the active agent and from 5 to 95 percent by weight, of sodium chloride, any other ingredients being animal feed supplement block ingredients. Also representative of such relatively concentrated compositions is a slow-release type of composition containing one of the active agents in the form of small pellets or granules which are administered orally and which lodge internally and release their contents over an extended period of time. Another relatively concentrated composition with which the present invention can be practiced is a vitamin-mineral concentrate supplement containing the active agent; the active agent can be present, for example, in the amount of from 1 to 50 percent, or more, by weight of total composition. This supplement can be administered directly, as in tablet form, or spread over, or even mixed into, regular feed. In all such relatively concentrated compositions, the exact concentration is dependent upon the consumption patterns of the particular animal. In all instances, the concentration is adjusted to provide treatment with an amount, based upon weight of the animal, as described foregoing.

Where one or more of the compounds is provided as a constituent of the principal food or water ration, satisfactory results are obtained with rations containing a minor but effective amount of the compounds. The exact amounts of the compounds in the ration or drinking water are dependent upon the food and water consumption and feeding and watering habits of the animal concerned. In animal feeds, the required dosage can be supplied with feeds containing 0.001 percent or more and usually from 0.001 to 0.5 percent by weight of active material. When fed as the principal food ration, the required dosage is conveniently supplied with feeds containing from 0.001 to 0.3 percent by weight of active agent. When it is convenient to administer the active agent in water, concentrations should be adjusted according to the known water demand of the animal to be treated. Animals with low water demand are treated with higher water concentrations, and animals with higher water demand are effectively treated with the active agent in lower concentrations. In this situation, the total amount ingested should be adjusted so as to approximate the same intake per unit body weight as would be achieved in other methods of administration. In compositions to be employed as concentrates, the active agents can be present in a concentration of from 0.5 to 98 or 5 to 98 percent by weight. Preferred concentrate compositions oftentimes contain two or more percent by weight of a liquid or solid surface active agent.

Liquid feed compositions containing the desired amount of the compounds can be prepared by dissolving the compounds in ethanol, propylene glycol or an edible oil or by dispersing them in water with or without the aid of a suitable surface active dispersing agent such as an ionic or non-ionic surface active agent. Suitable surface active dispersing agents include the glycerol and sorbitan esters of fatty acids and the polyoxyalkylene derivatives of fatty alcohols and of sorbitan esters. The aqueous compositions can contain one or more water-immiscible oils as a solvent for the active agent. In such compositions, the water, oil and emulsifying agent constitute an aqueous emulsion adjuvant or helper.

In the preparation of solid feed compositions, the compounds can be mechanically ground with an edible solid such as cereal meal, ground yellow corn, ground oats, finely ground meat and bone scraps, or a solid surface active dispersing agent such as finely divided bentonite or fuller's earth. These compositions can be administered in the form of capsules or tablets or dispersed in an animal feed and such feed used to supply a part or all of the ration. Alternatively, the compounds can be dissolved in an organic solvent such as alcohol or acetone and the resulting mixture dispersed in an animal feed which is then dried to remove the solvent. The compounds can also be dispersed in an edible oil such as coconut, olive, linseed, soybean, cottonseed or peanut oil, or animal fats and tallows, and the resulting mixtures dispersed in the feed. These edible oil compositions can contain one of the aforementioned emulsifying materials as a dispersing agent.

In the embodiment of the present invention for controlling ectoparasites, initially, and thereafter by the same administration controlling the host animal, it is not critical that the adjuvants of the composition administered are such as to be completely edible, it being adequate if the composition is not fatal to the host until a time after the ectoparasites have been controlled. In such instance, then, adjuvants are critically "edible" only to the extent of permitting the ectoparasite control to be achieved first.

It is noted that the composition with which the present active agent is administered can include, in addition to the types of substances discussed foregoing, one or more other growth-promoting substances, including known parasiticidal agents. As such agents, there is mentioned O,O-dimethyl O-(2,4,5-trichlorophenyl) phosphorothioate.

The following examples illustrate the invention but are not to be construed as limiting.

EXAMPLES 1-5

Various of the compounds to be employed as active agent in accordance with the present invention were evaluated for the control of *Rhipicephalus sanguineus*, commonly known as the brown dog tick. The host animals employed in the evaluations were dogs infested with known numbers of adults and larvae of *Rhipicephalus sanguineus*. Administration of the compounds was carried out by means of gelatin capsules. Following the administration, the dogs were held for a period of about one day under conditions conducive to their health and well being. Other dogs, similarly infested with the same known numbers of *Rhipicephalus sanguineus*, were left untreated but otherwise held under the same conditions for the same period of time, to serve as a control.

At the end of the one day period, all the dogs were examined to determine the percent of the control of *Rhipicephalus sanguineus* in each of the adult and larval forms. The compounds employed and the results obtained are set forth in the following table:

| Compound evaluated | Dosage in milligrams per kilogram | Percent control Adults | Larvae |
|---|---|---|---|
| O-phenyl N,N'-dimethylphosphorodiamidothioate | 50 | 100 | 100 |
| O-phenyl N,N,N',N'-tetramethylphosphorodiamidate | 100 | 100 | 100 |
| O-phenyl N,N'-dimethylphosphorodiamidate | 50 | 100 | 100 |
| O-phenyl N,N,N',N'-tetramethylphosphorodiamidothioate | 50 | 100 | 100 |
| O-p-Tolyl N,N'-dimethylphosphorodiamidothioate | 100 | 100 | 100 |
| Control | | 0 | 0 |

At the time of the observations, the tick larvae and adults on the control group appeared in all respects to be healthy and thriving.

EXAMPLE 6

O-phenyl N,N'-dimethylphosphorodiamidothioate was further evaluated for the control of larvae of *Rhipicephalus sanguineus*. The evaluation was carried out in accordance with the procedures employed in Examples 1-5, except that lower rates were employed. The results are set forth in the following table:

Dosage in milligrams per kilogram:    Percent control of *Rhipicephalus sanguineus* larvae

25 ---- 100
10 ---- 100
5 ---- 90

At the time of the observations, the tick larvae on the control group appeared in all respects to be healthy and thriving.

EXAMPLE 7

O-phenyl N,N'-dimethylphosphorodiamidate was evaluated for the control of *Rhipicephalus sanguineus* (brown dog tick), *Ambylomma americanum* (lone star tick) and *Dermacentor variabilis* (American dog tick) on a calf which had been infested with known numbers of each of these species. Beginning twenty-four hours following the infestation, and continuing at twenty-four hour intervals, O-phenyl N,N'-dimethylphosphorodiamidate was administered to the calf at a rate of 10 milligrams per kilogram of the calf body weight. A total of five such administrations was made. Another calf was infested with the same numbers of the same species but left untreated to serve as a control. During the entire evaluation period, both calves were maintained under essentially the same conditions. Twenty-four hours following the last administration of the compound, the calves were examined to determine the number, if any, of live ticks present. It was found that the calf treated with O-phenyl N,N'-dimethylphosphorodiamidate was entirely free of ticks; however, the control calf continued to be heavily infested with each of the tick organisms.

EXAMPLE 8

O-phenyl N,N' - dimethylphosphorodiamidothioate was evaluated for the control of *Rhipicephalus sanguineus*, *Amblyomma americanum*, and *Dermacentor variabilis*. The evaluation was carried out in accordance with the procedures of Example 7. The results are set forth in the following table:

Percent kill

*Rhipicephalus sanguineus* ---- 99
*Amblyomma americanum*:
  Larvae ---- 100
  Nymphs ---- 100
*Dermacentor variabilis* ---- 100

At the time of the evaluations, the ticks on the control calf appeared in all respects to be healthy and thriving.

EXAMPLE 9

O-phenyl N,N'-dimethylphosphorodiamidothioate was evaluated for the control of *Cochliomyia hominivorax* (screw-worm fly) and *Stomoxys calcitrans* (stable fly). In this evaluation, 7.5 grams of the compound was administered to a calf weighting 351 pounds. The administration was made with a gelatin capsule containing the compound. The calf to which the compound was administered had been infested about one day prior to treatment with larvae of the screw-worm fly. Following treatment, the calf was observed periodically to determine the effect, if any, of treatment upon the screw-worm fly larvae. Twenty-four hours following treatment, all screw-worm fly larvae were dead.

Concurrently with the foregoing operations, known numbers, of stable flies were introduced onto the calf periodically and permitted to feed on its blood. Such an introduction 3 hours following treatment resulted in a 91 percent kill of the stable flies with the subsequent 24 hours. A further introduction five hours after treatment resulted in a 100 percent kill within the subsequent 24 hours.

EXAMPLE 10

Ninety parts by weight of O-phenyl N,N'-dimethylphosphorodiamidothioate are mechanically ground with ten parts by weight of bentonite to produce a concentrate composition containing 90 percent by weight of the subject compound.

In identical procedures, other concentrate compositions containing 90 percent of one of the following compounds are separately prepared: O-phenyl N,N,N',N'-tetramethylphosphorodiamidothioate; O-phenyl N,N'-dimethylphosphorodiamidate; O-o-tolyl N,N'-dimethylphosphorodiamidate; and O-phenyl N,N,N',N'-tetramethylphosphorodiamidate.

EXAMPLE 11

In other procedures, feed supplements are prepared by grinding together 50 parts by weight of one of the compounds to be employed in accordance with the present invention with one part of sorbitan monopalmitate (Span 20) and 49 parts by weight of attapulgite clay to produce compositions containing 50 percent by weight of one of the subject compounds. In these procedures, feed supplements are separately prepared with each of O-p-tolyl N,N'-dimethylphosphorodiamidothioate; O-phenyl N,N'-dimethylphosphorodiamidothioate; O - phenyl N,N,N',N' - tetramethylphosphorodiamidothioate; O-phenyl N,N'-dimethylphosphorodiamidate; O-m-tolyl N,N,N',N'-tetramethylphosphorodiamidothioate; and O-phenyl N,N,N',N'-tetramethylphosphorodiamidate.

EXAMPLE 12

In other operations, 20 parts by weight of one of the compounds to be employed in accordance with the present invention are mechanically mixed with 80 parts of soy bean meal to produce animal food compositions containing 20 percent of the respective compound. In this manner, compositions are separately prepared with each of the compounds identified in Example 11.

EXAMPLE 13

In a yet further series of operations, each of the compounds identified in Example 11 is separately employed to prepare an animal feed composition. In this series of operations, the respective subject compound is dispersed in a commercial animal feed to produce the treated feed composition containing the subject compound in an amount of 0.033 percent by weight. The compositions prepared in this series of operations are of outstanding nutritive value and are of outstanding growth promoting value; they are adapted to be fed to small animals, such as those of a size of 15 to 25 pounds, to obtain a growth-furthering effect, and to protect against the attack of ectoparasites.

EXAMPLE 14

A salt block composition comprising O-phenyl N,N'-dimethylphosphorodiamidate is prepared. The preparation is carried out by adding the compound to the ingredients for a standard salt block mix in a small amount of dried molasses, as a binder, and thereafter compacting the re-resulting mixture in a standard salt block shape and size. The compound and standard ingredients are employed in amounts to obtain a composition having the following analysis:

| | Percentages by wt. of total composition |
|---|---|
| O-phenyl N,N'-dimethylphosphorodiamidate | 20 |
| Sodium chloride | 35 |
| Calcium | 15 |
| Phosphorus | 5 |
| Iodine | 0.016 |
| Other ingredients including minerals and molasses | 24.98 |

Other salt block compositions are prepared in the same manner as described foregoing except that instead of O-phenyl N,N'-dimethylphosphorodiamidate, the following are employed, each in a separate operation: O-phenyl N,N,N',N' - tetramethylphosphorodiamidate, O - phenyl N,N' - dimethylphosphorodiamidothioate, and O - phenyl N,N,N',N' - tetramethylphosphorodiamidothioate. These compositions are adapted to be made available to livestock, especially cattle, and especially those cattle feeding on range, to improve the growth and nutrition of the animals and to protect the animals from the attack of ectoparasites.

EXAMPLE 15

In other operations, a vitamin supplement comprising O-phenyl N,N'-dimethylphosphorodiamidate and suitable for supplemental feeding of dogs, cats, and the like, is prepared. The preparation is carried out by thoroughly mixing and blending together the O-phenyl N,N'-dimethylphosphorodiamidate and a commercially available supplemental vitamin mix to obtain a modified composition comprising 5 percent of the active agent. This composition is especially adapted to be administered as a supplement to the feed for dogs, cats, and the like, to improve the health of such animals and in particular to protect the animals from the attack of various ectoparasites.

We claim:

1. Method useful for the systematic control and kill of an ectoparasite which attacks a warm-blooded animal which comprises administering orally to the warm-blooded animal an amount of from 1.0 to 1,000 milligrams per kilogram of animal weight of an ectoparasiticidal agent of the formula:

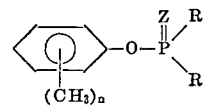

wherein Z represents oxygen or sulfur; each R independently represents methylamino or dimethylamino; and $n$ represents an integer of from 0 to 1, both inclusive.

2. The method of claim 1 wherein the ectoparasiticidal agent is a compound wherein $n$ represents 0.

3. The method of claim 2 wherein the ectoparasiticidal agent is O-phenyl N,N'-dimethylphosphorodiamidothioate.

4. The method of claim 2 wherein the ectoparasiticidal agent is O-phenyl N,N,N'N'-tetramethylphosphorodimidothioate.

5. The method of claim 2 wherein the ectoparasiticidal agent is O-phenyl N,N'-dimethylphosphorodiamidate.

6. The method of claim 2 wherein the ectoparasiticidal agent is O-phenyl N,N,N',N'-tetramethylphosphorodiamidate.

7. The method of claim 1 wherein the ectoparasiticidal agent is a compound wherein $n$ represents 1.

References Cited

UNITED STATES PATENTS

| 2,929,762 | 3/1960 | Wasco et al. | 167—53 |
| 3,074,846 | 1/1963 | Nichols | 167—53 |
| 3,089,808 | 5/1963 | Meltzer et al. | 424—220 |
| 3,157,568 | 11/1964 | Schoot et al. | 424—220 |

FOREIGN PATENTS

| 605,268 | 7/1948 | Great Britain. |

ALBERT T. MEYERS, Primary Examiner

J. V. COSTIGAN, Assistant Examiner